United States Patent [19]

Yamamoto et al.

[11] Patent Number: 4,565,798
[45] Date of Patent: Jan. 21, 1986

[54] PROCESS FOR POLYMERIZATION OF OLEFINS

[75] Inventors: Tadashi Yamamoto; Hiroyuki Furuhashi; Masafumi Imai; Hiroshi Ueno; Naomi Inaba, all of Saitama, Japan

[73] Assignee: TOA Nenryo Kogyo Kabushiki Kaisha, Tokyo, Japan

[21] Appl. No.: 672,780

[22] Filed: Nov. 19, 1984

[30] Foreign Application Priority Data

Nov. 29, 1983 [JP] Japan ................... 58-223247

[51] Int. Cl.⁴ ............................. C08F 4/64
[52] U.S. Cl. ..................... 502/119; 502/118; 502/121; 502/122; 502/123; 502/124; 502/125; 502/126; 502/127; 526/124
[58] Field of Search .......... 502/118, 119, 121, 122, 502/123, 124, 125, 126, 127

[56] References Cited

U.S. PATENT DOCUMENTS

| | | | |
|---|---|---|---|
| 3,135,809 | 6/1964 | Bosmajian | 502/114 X |
| 3,951,935 | 4/1976 | Engelmann | 502/119 X |
| 4,039,472 | 8/1977 | Hoff | 502/119 |
| 4,115,319 | 9/1978 | Scata et al. | 502/115 |
| 4,128,606 | 12/1978 | Furutachi et al. | 260/878 B |
| 4,159,963 | 7/1979 | Sakurai et al. | 502/116 |
| 4,232,139 | 11/1980 | Minami et al. | 502/127 X |
| 4,316,966 | 2/1982 | Mineshima et al. | 525/53 |
| 4,324,690 | 4/1982 | Karayannis et al. | 502/127 X |
| 4,431,568 | 2/1984 | Miya et al. | 502/119 |
| 4,472,521 | 9/1984 | Band | 502/119 X |
| 4,491,652 | 1/1985 | Matthews et al. | 525/247 |

FOREIGN PATENT DOCUMENTS

| | | |
|---|---|---|
| 045977 | 2/1982 | European Pat. Off. |
| 58-138712A | 2/1982 | Japan . |
| 2033409 | 5/1980 | United Kingdom ........ 502/127 |

Primary Examiner—Patrick P. Garvin
Attorney, Agent, or Firm—Myron B. Kurtzman

[57] ABSTRACT

A process for polymerizing olefins in the presence of a catalyst composed of:

(A) a catalyst component obtained by contacting with one another,
  (a) a magnesium alkoxide,
  (b) a silicon compound having a hydrogen-silicon bond,
  (c) an electron donor compound, and
  (d) a titanium compound
(B) an organic compound of a metal of Groups I and III of the Periodic Table, and
(C) an organo silicon compound represented by the formula $R_q^9 SiX_g^2(OR^{10})_k$ wherein $R^9$ and $R^{10}$ are the same or different hydrocarbon groups, $X_2$ is a halogen atom, $0 \leq q < 4$, $0 \leq g < 4$, $0 < k \leq 4$, and $q + g + k = 4$.

11 Claims, No Drawings

PROCESS FOR POLYMERIZATION OF OLEFINS

DETAILED DESCRIPTION OF THE INVENTION

1. Field of the Invention

The present invention relates to a process for the polymerization of olefins, and more particularly, to a process for the highly stereoregular polymerization of alpha-olefins.

2. Background of the Invention

There are some known processes for the highly stereoregular polymerization of olefins, particularly alpha-olefins having three or more carbon atoms, by using a solid catalyst component composed essentially of magnesium, titanium, halogen, and an electron donor compound, and there have been proposed many methods for producing the catalyst component used for the polymerization. The catalyst component used for the polymerization of olefins is usually a combination of an organoaluminum compound and an electron donor compound Recently, some attempts have been made to polymerize olefins by using a catalyst in which a specific catalyst component is combined with an organoaluminum compound and an organosilicon compound. For example, there are disclosed a process that employs a solid catalyst composed of titanium halide or titanium haloalcoholate supported on an active magnesium halide compound and esters (EPA No. 45975), a process that employs a solid product obtained by contacting a hydrocarbon solution of a magnesium compound with a liquid titanium compound in the presence of an electron donor (GB No. 2111066), and a process that employs a component obtained by reacting a hydrocarbon-soluble organomagnesium with a chlorosilane having the Si—H bond, and a solid catalyst component obtained by contacting a titanium halide with a carboxylate ester (Japanese Patent Laid-open No. 36203/1980). The process that employs the solid catalyst components mentioned above is not necessarily satisfactory with respect to catalytic activity, particularly under the conditions for the production of polymers having a low melt flow rate.

DISCLOSURE OF THE INVENTION

Object of the Invention

It is an object of this invention to provide a process for the polymerization of olefins which makes it possible to produce in high yields olefin polymers having a high stereoregularity and high bulk density. In Japanese Patent Laid-open No. 198503/1983, commonly assigned, there is disclosed a catalyst component obtained by contacting a magnesium alkoxide, a silicon compound having the hydrogen-silicon bond, an electron donor compound, and a titanium compound with one another, said catalyst component permitting one to produce in high yields olefin polymers having a high stereoregularity and high bulk density. It has been discovered that the object of this invention can be achieved with the above-mentioned catalyst component when it is combined with a catalyst comprising an organic compound of a metal of Group I to III in the Periodic Table and an organo-silicon compound.

SUMMARY OF THE INVENTION

The gist of this invention resides in the catalyst system and a process for polymerizing olefins in the presence of said catalyst system comprising (A) a catalyst component obtained by contacting (1) a magnesium alkoxide, (2) a silicon compound having the hydrogen-silicon bond, (3) an electron donor compound, and (4) a titanium compound with one another, (B) an organic compound of a metal in Group I to III of the Periodic Table, and (C) an organosilicon compound represented by the formula $R_pSiX_m(OR')_n$, wherein R and R' are the same or different $C_{1-20}$ hydrocarbon groups, X is a halogen atom, $0 \leq p < 4$, $0 \leq m < 4$, $0 < n \leq 4$, and $p+m+n=4$.

The Catalyst Component

The raw materials used for the preparation of the catalyst component in this invention are described below: (A) Magnesium alkoxide The magnesium alkoxide used in this invention is one which is represented by the formula Mg(OR)(OR'), where R and R' are alkyl, alkenyl, cycloalkyl, aryl, or aralkyl groups having 1 to 20 carbon atoms, preferably 1 to 10 carbon atoms, and R and R' may be the same or different.

These compounds include, for example, $Mg(OCH_3)_2$, $Mg(OC_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(Oi-C_4H_9)$, $Mg(OC_4H_9)Osec-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

These magnesium alkoxides should preferably be dried before use, and more preferably be dried with heating under reduced pressure. They may be readily obtained commercially or may be synthesized by the known method.

Prior to use, the magnesium alkoxides may be preliminarily contacted with an inorganic or organic inert solid substance.

Suitable examples of the inorganic solid substance include metal sulfate, metal hydroxide, metal carbonate, metal phosphate, and metal silicate, such as $Mg(OH)_2$, $BaCO_3$, and $Ca_3(PO_4)_2$.

Suitable examples of the organic solid substance include low-molecular weight compounds such as durene, anthracene, naphthalene, diphenyl, and other aromatic hydrocarbons, and also high-molecular weight compounds such as polyethylene, polypropylene, polyvinyltoluene, polystyrene, polymethyl methacrylate, polyamide, polyester, and polyvinyl chloride.

(B) Silicon Compound

Any silicon compound having the hydrogen-silicon bond can be used in this invention. It is represented by the formula $H_sR''_tSiX'_r$ where R'' is a hydrocarbon group, R'''O— ($R_4'''$=hydrocarbon group), $R^2R^3N$— ($R^2$ and $R^3$=hydrocarbon groups), or $R^4COO$—($R^4$=hydrogen atom or hydrocarbon group); X is a halogen atom; s is 1 to 3; $0 \leq r < 4$, and $s+t+r=4$. The groups represented by R'' may be the same or different when t is greater than 1.

The hydrocarbon groups represented by R'', R''', $R^2$, $R^3$, and $R^4$ include, for example, alkyl, alkenyl, cycloalkyl, aryl, and aralkyl of carbon number 1 to 16. The alkyl group includes methyl, ethyl, propyl, n-butyl, isobutyl, n-hexyl, n-octyl, 2-ethylhexyl, and n-decyl. The alkenyl group includes vinyl, allyl, isopropenyl, propenyl, and butenyl. The cycloalkyl group includes cyclopentyl and cyclohexyl. The aryl group includes phenyl, tolyl, and xylyl. The aralkyl group includes benzyl, phenetyl, and phenylpropyl.

Preferable among them are lower alkyl groups such as methyl, ethyl, propyl, isopropyl, n-butyl, isobutyl, and t-butyl, and aryl groups such as phenyl and tolyl.

X' in the above formula denotes a halogen atom such as chlorine, bromine, and iodine. Preferable among them is chlorine.

Examples of the silicon compound include $HSiCl_3$, $H_2SiCl_2$, $H_3SiCl$, $HCH_3SiCl_2$, $HC_2H_5SiCl_2$, $H(t—C_4H_9)SiCl_2$, $HC_6H_5SiCl_2$, $H(CH_3)_2SiCl$, $H(i—C_3H_7)_2SiCl$, $H_2C_2H_5SiCl$, $H_2(n—C_4H_9)SiCl$, $H_2(C_6H_4CH_3)SiCl$, $HSi(CH_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2[N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_3SiH_2$, $C_6H_5(CH_3)_2SiH$, $(n—C_3H_7)_3SiH$, $HSiCl(C_6H_5)_2$, $H_2Si(C_6H_5)_2$, $HSi(C_6H_5)_2CH_3$, $(n—C_5H_{11}O)SiH$, $HSi(C_6H_5)_3$, and $(n—C_5H_{11})_3SiH$. Additional compounds include $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2Si]_2C_6H_4$, $[H(CH_3)_2SiO]_2Si(CH_3)_2$, $[(CH_3)_3SiO]_2SiHCH_3$, $[(CH_3)_3SiO]_3SiH$, and

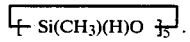

Preferable among them are those silicon halide compound in which R″ is a hydrocarbon, t is 0 to 2, and r is 1 to 3, as exemplified by $HSiCl_3$, $H_2SiCl_2$, $H_3SiCl$, $HCH_3SiCl_2$, $HC_2H_5SiCl_2$, $H(t—C_4H_9)SiCl_2$, $HC_6H_5SiCl_2$, $H(CH_3)_2SiCl$, $H(i—C_3H_7)_2SiCl$, $H_2C_2H_5SiCl$, $H_2(n—C_4H_9)SiCl$, $H_2(C_6H_4CH_3)SiCl$, and $HSiCl(C_6H_5)_2$. Most suitable among them are $HSiCl_3$, $HCH_3SiCl_2$, $H(CH_3)_2SiCl$ and especially $HSiCl_3$.

(C) Electron Donor Compound

The electron donor compound used in this invention includes carboxylic acids, carboxylic acid anhydrides, carboxylate esters, carboxylic acid halides, alcohols, ethers, ketones, amines, amides, nitriles, aldehydes, alcoholates, phosphoamides, thioethers, thioesters, carbonate esters, and compounds of phosphorus, arsenic, or antimony attached to an organic group through a carbon or oxygen atom. Preferable among them are carboxylic acids, carboxylic acid anhydrides, carboxylate esters, halogenated carboxylic acids, alcohols, and ethers.

Examples of the carboxylic acids include aliphatic monocarboxylic acids such as formic acid, acetic acid, propionic acid, butyric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebacic acid, maleic acid, and fumaric acid; aliphatic oxycarboxylic acids such as tartaric acid; alicyclic carboxylic acids such as cyclohexane monocarboxylic acid, cyclohexene monocarboxylic acid, cis-1,2-cyclohexane dicarboxylic acid, and cis-4-methylcyclohexene-1,2-dicarboxylic acid; aromatic monocarboxylic acids such as benzoic acid, toluic acid, anisic acid, p-t-butylbenzoic acid, naphthoic acid, and cinnamic acid; and aromatic dicarboxylic acids such as phthalic acid, isophthalic acid, terephthalic acid, and naphthalic acid.

The carboxylic acid anhydrides are the acid anhydrides of the above-mentioned carboxylic acids.

The carboxylate esters that can be used are mono-or diesters of the above-mentioned carboxylic acids. Examples of the carboxylate esters include butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexane carboxylate, methyl benzoate, ethyl benzoate, methyl p-toluate, ethyl p-t-butylbenzoate, ethyl p-anisate, ethyl alpha-naphthoate, isobutyl alpha-naphthoate, ethyl cinnamate, monomethyl phthlate, dibutyl phthalate, diisobutyl phthalate, dihexyl phthalate, dioctyl phthalate, di-2-ethylhexyl phthalate, diallyl phthalate, diphenyl phthalate, diethyl isophthalate, isobutyl isophthalate, diethyl terephthalate, dibutyl terephthalate, diethyl naphthalate, and dibutyl naphthalate.

The carboxylic acid halides that can be used are acid halides of the above-mentioned carboxylic acids. Their examples include acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexanecarboxylic acid chloride, chclohexanecarboxylic acid bromide, 1-cyclohexenecarboxylic acid chloride, cis-4-methylcyclohexenecarboxylic acid chloride, cis-4-methylcyclohexenecarboxylic acid bromide, benzoyl chloride, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthanlic acid dichloride. Additional examples include dicarboxylic acid monoalkylhalides such as adipic acid monomethylchloride, maleic acid monoethylchloride, and maleic acid monomethylchloride.

The alcohols are represented by the formula $R^5OH$, where $R^5$ is an alkyl, alkenyl, cycloalkyl, aryl, or aralkyl group of carbon number 1 to 12. Examples of the alcohols include methanol, ethanol, propanol, isopropanol, butanol, isobutanol, pentanol, hexanol, octanol, 2-ethylhexanol, cyclohexanol, benzyl alcohol, and allyl alcohol, phenol, cresol, xylenol, ethylphenol, isopropylphenol, p-t-butylphenol, and n-octylphenol.

The ethers are represented by the formula $R^6OR^7$, where $R^6$ and $R^7$ are alkyl, alkenyl, cycloalkyl, aryl, or aralkyl groups of carbon number 1 to 12, and $R^6$ and $R^7$ may be the same or different. Their examples include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether.

(D) Titanium Compound

The titanium compound used in this invention is a compound of divalent, trivalent, or tetravalent titanium. Examples of these compounds include titanium tetrachloride, titanium tetrabromide, trichloroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides such as titanium tetrachloride, trichloroethoxytitanium, dichlorodibutoxytitanium, and dichlorodiphenoxytitanium. Particularly preferable is titanium tetrachloride.

Preparation of Catalyst Component

The catalyst component used in this invention is obtained by contacting a magnesium alkoxide (component A), a silicon compound having the hydrogen-silicon bond (component B), an electron donor compound (component C) and a titanium compound (component D) with one another. The contacting of the four components can be accomplished by (1) contacting component A and component B with each other, contacting the resulting contact product with component C, and finally contacting the resulting contact product with component D, (2) contacting components A, B, and C with one another simultaneously and then contacting the resulting contact product with component D, or (3) contacting the four components with one another simultaneously. Methods (1) and (2) are preferable and method (1) is most suitable. Methods (1) and (2) are described below.

Method (1)

[1] Reaction of Magnesium Alkoxide with Silicon Compound

The reaction of a magnesium alkoxide (component A) with a silicon compound (component B) is accomplished by contacting them with each other. The reaction should preferably be accomplished by mixing and stirring them in the presence of a hydrocarbon.

The preferred hydrocarbon is a saturated aliphatic, saturated alicyclic, and aromatic hydrocarbon of carbon number 6 to 12 such as hexane, heptane, octane, cyclohexane, benzene, toluene, and xylene.

One mol of component A is contacted with 0.5 to 10 mol, preferably 1 to 5 mol, of component B. The contacting is carried out at 0° to 200° C. for 0.5 to 100 hours. Either comppnent A and component B may contain more than one kind of compound.

The hydrocarbon may be used in any amount; but preferably, an amount less than 100 ml should be used for 1 g of component A.

In the case where a silicon halide is used as component B, a gas will evolve upon contact with component A, indicating that the reaction is proceeding. The composition of the gas and the analysis of the reaction product indicates that the reaction forms a compound containing the silicon atom, said compound being insoluble in an inert solvent, particularly n-hexane or n-heptane, at 65° C.

The contact product of component A and component B is separated from the reaction system and used for the subsequent contacting. It may be washed with an inert hydrocarbon like the one used in the contacting of component A and component B. The washing may be carried out with heating.

[2] Contacting with Electron Donor Compound

The reaction product obtained in the above step [1] is then contacted with an electron donor compound (component C). The contacting is accomplished by mixing and stirring them together or by mechanically copulverizing them in the presence or absence of an inert hydrocarbon. The preferred hydrocarbons are hexane, heptane, octane, cyclohexane, benzene, toluene, and xylene.

The contacting by mechanical copulverizing is carried out at 0° to 100° C. for 0.1 to 100 hours. The contacting by mere stirring is carried out at 0° to 150° C. for 0.5 to 10 hours.

Component C should preferably be used in an amount of 0.005 to 10 gram mol, preferably 0.01 to 1 gram mol, for 1 gram atom of magnesium in the contact product of magnesium alkoxide and silicon compound.

[3] Contacting with Titanium Compound

The contact product obtained in the above step [2] (designated as contact product 1) is subsequently contacted with a titanium compound (component D). The contact product 1 may be washed with a proper cleaning agent such as the above-mentioned inert hydrocarbon before it is contacted with component D.

The contacting of contact product 1 and component D may be achieved by simply bringing them into contact with each other; but it is preferable to mix and stir both of them in the presence of a hydrocarbon such as hexane, heptane, octane, cyclohexane, benzene, toluene, and xylene.

Component D should be used in an amount of 0.1 gram mol or above, preferably 1 to 50 gram mol, for 1 gram atom of magnesium in the contact product 1.

The contacting in the presence of a hydrocarbon should be carried out at 0° to 200° C. for 0.5 to 20 hours, preferably at 60° to 150° C. for 1 to 5 hours.

The contacting with component D should preferably be performed more than once. The second contact may be performed in the same way as mentioned above; but, in the case where the first contact is performed in the presence of a hydrocarbon, the second contact should preferably be performed after the separation of the hydrocarbon.

Method (2)

[1] Contacting of Magnesium Alkoxide, Silicon Compound, and Electron Donor Compound A magnesium alkoxide (component A), a silicon compound (component B), and an electron donor compound (component C) may be contacted with one another simultaneously. This contacting should preferably be performed by mixing and stirring in the presence of an inert hydrocarbon such as hexane, heptane, octane, cyclohexane, benzene, toluene, and xylene. Contacting by mechanical copulverizing may also be employed.

The contacting of components A, B, and C should be performed in the ratio of 1 mol of component A, 0.5 to 10 mol, preferably 1 to 5 mol, of component B, and 0.005 to 10 mol, preferably 0.05 to 1 mol, of component C. The contacting of the three components is performed at 0° to 200° C. for 0.1 to 100 hours. Each component may contain more than one kind of compound.

The hydrocarbon may be used in any amount; but it is usually 100 ml or less for 1 g of component A. The contact product of the three components is used for the subsequent contacting after separation, or without separation, from the reaction system. Prior to the subsequent contacting, the contact product may be washed, as required, with such an inert hydrocarbon as used in the contacting of the three components. Washing may be performed with heating.

[2] Contacting with Titanium Compound

The contact product obtained in the above step [1] is then contacted with a titanium compound (component D). This contacting is accomplished in the same way as mentioned in step [3] of method (1).

The solid product obtained in the above method (1) or (2) is washed, as required, with an inert hydrocarbon such as hexane, heptane, octane, cyclohexane, benzene, toluene, and xylene, followed by drying. Thus there is obtained the catalyst component used in this invention.

Catalyst for Polymerization of Olefin

The catalyst component obtained as mentioned above is made into the polymerization catalyst used in this invention by combining it with a cocatalyst comprising an organic compound of Group I - III metals and an organosilicon compound.

Organic Compound of Group I–III Metals

According to this invention, an organic compound of lithium, magnesium, calcium, zinc, or aluminum can be used. The preferred organometallic is an organoaluminum compound represented by the formula $R_w^8AlX'''_{3-w}$, where $R^8$ is an alkyl or aryl group; $X'''$ is a halogen atom, alkoxyl group, or hydrogen atom; and w is any number in the range of $1 \leq w \leq 3$. Preferred organoaluminum compounds are alkyl aluminum compounds and a mixture thereof or complex thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compounds include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among them are trialkyl aluminums, and most suitable among them are triethyl aluminum and triisobutyl aluminum. These trialkyl aluminums may be used in combination with other organoaluminum compounds such as commercially available diethyl aluminum chloride, ethyl aluminum dichloride, ethyl aluminum sesquichloride, diethyl aluminum ethoxide, or diethyl aluminum hydride, or a mixture or a complex thereof.

According to this invention, it is also possible to use an organoaluminum compound in which two or more aluminum atoms are bonded through an oxygen atom or a nitrogen atom. Examples of such compounds include those which are represented by the formulas $(C_2H_5)_2AlOAl(C_2H_5)_2$, $(C_4H_9)_2AlOAl(C_4H_9)_2$, and $(C_2H_5)_2AlC_2H_5NAl(C_2H_5)_2$.

Organic compounds of other metals than aluminum include, for example, diethyl magnesium, ethyl magnesium chloride, diethyl zinc, $LiAl(C_2H_5)_4$, and $LiAl(C_7H_{15})_4$.

The organometal compound is used in an amount of 1 to 2000 gram mol, preferably 10 to 700 gram mol, for 1 gram atom of titanium in the catalyst component.

Organosilicon Compound

The organosilaicon compound used as one component of the polymerization catalyst is one which is represented by the formula $R_pSiX_m(OR')_n$ where R and R' are the same or different hydrocarbon groups, X is a halogen atom, $0 \leq p < 4$, $0 \leq m < 4$, $0 < n \leq 4$, and $p+m+n=4$. The hydrocarbon groups include alkyl, alkenyl, cycloalkyl, aryl, and aralkyl groups. If q is 2 or above, $R^9$ may denote hydrocarbon groups of different kind. The halogen atom represented by X should preferably be a chlorine atom.

Examples of the organosilicon compound include tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyoxysilane, dimethyldiphenoxysilane, diethyldiethyoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane and chlorophenyldiethoxysilane. Preferable among them are ethyltriethoxysilane, vinyltriethoxysilane, phenyltrimethoxysilane, phenyltriethoxysilane, diphenyldimethoxysilane, methyphenyldimethoxysilane, and chlorophenyldiethoxysilane.

The silicon compound is used in an amount of 0.02 to 2.0 gram mol, preferably 0.05 to 0.8 gram mol, for 1 gram atom of metal in the organometallic compound.

The silicon compounds of more than one kind may be used in combination with one another. It also may be combined with an electron donor compound to give a polymer which is improved in stereoregularity. The electron donor compound used for this purpose may be any one which is used for the preparation of the catalyst component used in this invention. The preferred ones are carboxylate esters, alcohols, ethers, and ketones.

The electron donor compound is used in an amount of 0.005 to 1.0 gram mol, preferably 0.01 to 0.5 gram mol, for 1 gram atom of metal in the organometallic compound.

The silicon compound and the electron donor compound which is used as required may be combined with the organometallic compound and the catalyst component simultaneously or may be used after being previously contacted with the organometallic compound.

Polymerization of Olefin

The polymerization catalyst as mentioned above is used for homopolymerization of monoolefins or copolymerization of a monoolefin with other monoolefin or diolefin. It is particularly suitable for homopolymerization of alpha-olefins, particularly alpha-olefins of carbon number 3 to 10 such as propylene, 1-butene, 4-methyl-1-pentene, and 1-hexene. It is also suitable for random stereoregular copolymerization of alpha-olefins or an alpha-olefin and ethylene.

The polymerization may be performed either in gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually $-80°$ C. to $+150°$ C., preferably 40 to 120° C. The polymerization pressure is 1 to 60 atm. The molecular weight modification of the resulting polymer is accomplished in the presence of hydrogen or other known molecular weight modifiers. In the copolymerization of olefin, the quantity of other olefin to be copolymerized is usually less than 30 wt %, particularly 0.3 to 15 wt %, based on the olefin. The polymerization with the catalyst system of this invention may be performed continuously or batchwise under the commonly used conditions.

Effect of Invention

The polymerization catalyst constructed as mentioned above provides. in high yields olefin polymers having high stereoregularity and high bulk density and exhibits a high catalytic activity over a long period of time.

EXAMPLES

The invention is described in more detail with reference to the following examples.

The scope of this invention is not limited by the examples. Percent (%) in the examples means wt %, unless otherwise indicated.

The polymerization activity Kc is the quantity (g) of polymer formed per gram of the catalyst component, and Kt is the quantity (kg) of polymer formed per gram of titanium in the catalyst component.

The heptane insolubles (abbreviated as H.I.) that indicates the ratio of crystalline fraction in the polymer is the quantity of polymer that remains undissolved when extracted with boiling n-heptane for 6 hours by using a Soxhlet extractor of improved type. The melt flow rate (MFR) was measured according to ASTM D-1238, and the bulk density was measured according to ASTM D-1895-69.

EXAMPLE 1

Preparation of Catalyst Component

Into a 500-ml glass reactor equipped with a reflux condenser, dropping funnel, and stirrer, with the atmosphere replaced with nitrogen, were charged 35 g (0.31 mol) of commercial magnesium diethoxide and 100 ml of n-heptane. While stirring at room temperature, a mixture of 104 g (0.77 mol) of trichlorosilane and 30 ml of n-heptane was dropped from the dropping funnel over 45 minutes. Stirring was continued at 70° C. for 6 hours. During this period, the reactants gave off a gas, which was found to contain ethyl chloride, ethylene. The solid thus obtained was filtered off at 70° C. and washed with five 300-ml portions of n-hexane at 65° C., followed by drying at 60° C. for 30 minutes under reduced pressure. Thus there was obtained solid component (I).

Fifteen grams of solid component (I) was placed under the nitrogen gas atmosphere in a 300-ml stainless steel (SUS 316) balls, 12 mm in diameter. Then, 3.8 g of ethyl benzoate was added to the mill pot. The mill pot was vibrated on a vibrator for 1 hour to carry out contacting. Thus there was obtained solid component (II).

10.1 g of the solid component (II) was placed under the nitrogen gas atmosphere in a 200-ml glass reactor equipped with a stirrer. Then, 40 ml of toluene and 60 ml of titanium tetrachloride were added to the reactor, followed by stirring at 90° C. for 2 hours. After removal of the supernatant liquid by decantation, 40 ml of toluene and 60 ml of titanium tetrachloride were added, followed by stirring at 90° C. for 2 hours. After removal of the supernatant liquid by decantation, 40 ml of toluene and 60 ml of titanium tetrachloride were added, followed by stirring at 90° C. for 2 hours. The resulting solid substance was filtered off at 90° C. and washed with seven 100-ml portions of n-hexane at 65° C., followed by drying at 60° C. for 30 minutes under reduced pressure. Thus there was obtained 7.0 g of catalyst component containing 3.0% of titanium.

Polymerization of Propylene

Into a 1.5-liter stainless steel (SUS 32) autoclave equipped with a stirrer was charged under the nitrogen gas atmosphere a mixture composed of (1) 11.2 mg of the catalyst component obtained as mentioned above, (2) 3.7 ml of n-heptane solution containing 1 mol of triethyl aluminum (abbreviated as TEAL) in 1 liter of n-heptane (this quantity corresponds to 150 gram atom of aluminum for 1 gram atom of titanium in the catalyst component), and (3) 2.10 ml of heptane solution containing 0.05 mol of phenyltriethoxysilane in 1 liter of heptane (this quantity corresponds to 0.10 gram mol for 1 gram atom of aluminum in the TEAL). The mixture was allowed to stand for 5 minutes prior to charging. Then 100 ml of hydrogen gas as the molecular weight modifier and 1 liter of liquefied propylene were forced in. The reaction system was heated to 70° C. and the polymerization of propylene was carried out for 1 hour.

When polymerization was complete, unreacted propylene was purged, and there was obtained 140 g of white polypropylene powder having an HI of 95.5%, an MFR of 2.6, and a bulk density of 0.38 g/cm$^3$.

Kc was 12,500 and Kt was 417.

A second polymerization of propylene was performed for 2 hours obtaining the following results.

HI=95.0%, MFR=2.8, bulk density=0.39 g/cm$^3$, Kc=23,100, and Kt=770.

EXAMPLES 2 to 18

Catalyst components were prepared in the same way as in Example 1 except that the ethyl benzoate with which catalyst component (I) was brought into contact was replaced by the electron donor compound as shown in Table 1. The catalyst components thus prepared were used for the polymerization of propylene in the same way as in Example 1. The results are shown in Table 1.

mol) of trichlorosilane and 60 ml of n-heptane was dropped from the dropping funnel over 45 minutes. Stirring was continued at 70° C. for 8 hours. During this period, the reactants gave off a gas, which was found to contain ethyl chloride, ethylene, hydrogen, and ethane. The solid thus obtained was filtered off at 70° C. and

TABLE 1

| Example | Electron donor compound | Titanium content (%) | Polymerization time (h) | Kc (g/g-cat.) | Kt (kg/g-Ti) | HI (%) | Bulk density (g/cm$^3$) | MFR (g/10 min) |
|---|---|---|---|---|---|---|---|---|
| 1 | Ethyl benzoate | 3.0 | 1 | 12,500 | 417 | 95.5 | 0.38 | 2.6 |
|   |   |   | 2 | 23,100 | 770 | 95.0 | 0.39 | 2.8 |
| 2 | Diisobutyl phthalate | 4.5 | 1 | 17,000 | 378 | 96.9 | 0.40 | 4.2 |
|   |   |   | 2 | 31,400 | 698 | 96.6 | 0.39 | 4.5 |
| 3 | Di-n-butyl phthalate | 4.0 | 1 | 15,200 | 380 | 96.8 | 0.37 | 3.2 |
|   |   |   | 2 | 28,100 | 703 | 96.5 | 0.37 | 3.5 |
| 4 | Phthalic anhydride | 5.0 | 1 | 14,800 | 296 | 96.1 | 0.34 | 4.5 |
|   |   |   | 2 | 27,800 | 556 | 95.5 | 0.36 | 4.8 |
| 5 | Phthalic acid chloride | 4.8 | 1 | 12,100 | 252 | 97.1 | 0.37 | 3.2 |
|   |   |   | 2 | 21,800 | 454 | 96.5 | 0.37 | 3.4 |
| 6 | Phthalic acid monomethyl chloride | 4.7 | 1 | 14,200 | 429 | 96.4 | 0.38 | 4.6 |
|   |   |   | 2 | 26,000 | 553 | 95.8 | 0.38 | 4.5 |
| 7 | Monomethyl phthalate | 5.0 | 1 | 15,500 | 310 | 95.0 | 0.39 | 3.8 |
|   |   |   | 2 | 28,000 | 560 | 94.9 | 0.37 | 4.0 |
| 8 | Benzoic anhydride | 3.5 | 1 | 10,100 | 289 | 95.5 | 0.35 | 2.1 |
|   |   |   | 2 | 18,200 | 520 | 95.0 | 0.36 | 2.4 |
| 9 | Benzoyl chloride | 3.8 | 1 | 11,500 | 303 | 94.9 | 0.35 | 1.8 |
|   |   |   | 2 | 21,600 | 569 | 94.5 | 0.35 | 2.0 |
| 10 | Ethyl cinnamate | 3.1 | 1 | 12,000 | 387 | 94.8 | 0.36 | 2.0 |
|   |   |   | 2 | 22,200 | 716 | 94.5 | 0.37 | 2.4 |
| 11 | Ethyl cyclohexane carboxylate | 2.8 | 1 | 12,100 | 432 | 95.1 | 0.38 | 2.4 |
|   |   |   | 2 | 22,700 | 812 | 94.7 | 0.37 | 2.6 |
| 12 | Tartaric acid | 3.8 | 1 | 10,200 | 268 | 94.3 | 0.37 | 1.5 |
|   |   |   | 2 | 19,400 | 510 | 94.0 | 0.38 | 2.1 |
| 13 | n-Butyl tatrate | 3.2 | 1 | 13,200 | 413 | 95.6 | 0.35 | 3.2 |
|   |   |   | 2 | 23,000 | 719 | 95.0 | 0.36 | 4.1 |
| 14 | Isobutyl methacrylate | 3.3 | 1 | 13,800 | 418 | 94.8 | 0.35 | 4.8 |
|   |   |   | 2 | 24,800 | 753 | 94.0 | 0.36 | 5.2 |
| 15 | Phthalic acid | 3.9 | 1 | 14,100 | 362 | 95.8 | 0.35 | 3.8 |
|   |   |   | 2 | 26,000 | 667 | 95.4 | 0.35 | 4.0 |
| 16 | Benzoic acid | 3.8 | 1 | 11,500 | 303 | 94.8 | 0.33 | 4.8 |
|   |   |   | 2 | 21,300 | 560 | 94.5 | 0.33 | 4.9 |
| 17 | Di-n-butyl maleate | 3.5 | 1 | 15,100 | 431 | 95.8 | 0.38 | 4.1 |
|   |   |   | 2 | 27,900 | 798 | 95.7 | 0.39 | 4.5 |
| 18 | Diisobutyl sebacate | 3.0 | 1 | 14,800 | 493 | 96.1 | 0.39 | 4.3 |
|   |   |   | 2 | 26,600 | 888 | 95.8 | 0.39 | 4.6 |

EXAMPLES 19 and 20

The catalyst component was prepared in the same way as in Example 1 except that the trichlorosilane with which magnesium diethyoxysilane was brought into contact was replaced by methyl dichlorosilane (Example 19) or dimethyl chlorosilane (Example 20). The resulting catalysts were used for the polymerization of propylene. The results are shown in Table 2.

EXAMPLE 21

The catalyst component was prepared in the same way as in Example 1 except that magnesium diethoxide was replaced by magnesium diisopropoxide. The resulting catalyst was used for the polymerization of propylene in the same was as in Example 1. The results are shown in Table 2.

EXAMPLE 22

Preparation of Catalyst Component

Into a 500-ml glass reactor equipped with a reflux condenser, dropping funnel, and stirrer, with the atmosphere replaced with nitrogen, were charged 30 g (0.26 mol) of commercial magnesium diethoxide, 173 ml of n-heptane, and 15.0 g of diisobutyl phthalate. While stirring at room temperature, a mixture of 89 g (0.66 mol) of trichlorosilane and 60 ml of n-heptane was dropped from the dropping funnel over 45 minutes. Stirring was continued at 70° C. for 8 hours. During this period, the reactants gave off a gas, which was found to contain ethyl chloride, ethylene, hydrogen, and ethane. The solid thus obtained was filtered off at 70° C. and washed with five 300-ml portions of n-hexane at 65° C., followed by drying at 60° C. for 30 minutes under reduced pressure. Thus there was obtained 45.1 g of solid component. This solid component was contacted with titanium tetrachloride in the same way as in Example 1 to give the catalyst component.

Polymerization of Propylene

The resulting catalyst was used for the polymerization of propylene in the same was as in Example 1. The results are shown in Table 2.

EXAMPLE 23

Polymerization of propylene was carried out in the same way as in Example 2 except that the quantity of hydrogen was changed to 750 ml. The results are shown in Table 2.

EXAMPLE 24

Polymerization of propylene was carried out in the same way as in Example 2 except that the quantity of TEAL was changed to such an amount that corresponds to 50 gram atom of aluminum for 1 gram atom of titanium in the catalyst. The results are shown in Table 2.

EXAMPLES 25 and 26

Polymerization of propylene was carried out in the same way as in Example 2 except that the quantity of phenyltriethoxysilane was changed to such an amount that corresponds to 0.20 gram mol (Example 25) or 0.05 gram mol (Example 26) for 1 gram atom of aluminum in TEAL. The results are shown in Table 2.

EXAMPLES 27 to 29

Polymerization of propylene was carried out for 1 hour in the same way as in Example 2 except that the phenyltriethoxysilane was replaced by the organosilicon compounds shown in Table 3 and the quantity of hydrogen was changed as shown in Table 3. The results are shown in Table 3.

TABLE 3

| Example | Organosilicon compound | Quantity of hydrogen (ml) | Kc (g/g-cat.) | Kt (kg/g-Ti) | HI (%) | Bulk density (g/cm$^3$) | MFR (g/10 min) |
|---|---|---|---|---|---|---|---|
| 27 | Diphenyldimethylsilane | 750 | 17,600 | 391 | 96.4 | 0.38 | 4.2 |
| 28 | Phenyltrimethoxysilane | 100 | 14,800 | 329 | 96.1 | 0.35 | 2.8 |
| 29 | Ethyltriethoxysilane | 100 | 14,000 | 311 | 96.4 | 0.35 | 3.5 |

EXAMPLE 30

Polymerization of propylene was carried out in the same way as in Example 2 except that TEAL was replaced by a mixture of TEAL and diethylaluminum chloride in the 4:1 molar ratio. The results are shown in Table 2.

COMPARATIVE EXAMPLE 1

Polymerization of propylene was carried out in the same way as in Example 2 except that phenyltriethoxysilane was replaced by ethyl p-anisate in an amount of 0.30 gram mol for 1 gram atom of aluminum in TEAL. The results are shown in Table 2.

COMPARATIVE EXAMPLE 2

Preparation of Catalyst Component

Into a 300-ml stainless steel (SUS 316) mill pot containing 100 pieces of stainless steel (SUS 316) balls 12 mm in diameter were charged, under the nitrogen gas atmosphere, 24.3 g of anhydrous magnesium chloride (containing less than 1% of water) and then 8.1 g of diisobutyl phthlate. This mill pot was vibrated on a vibrator for 20 hours. Thus there was obtained a solid component.

10.2 g of the solid component was placed, under the nitrogen gas atmosphere, in a 200-ml glass reactor equipped with a stirrer, and then 90 ml of titanium tetrachloride was added, followed by stirring at 80° C. for 2 hours. The resulting solid substance was filtered off at 80° C. and washed with seven 100-ml portions of n-hexane at 65° C., followed by drying at 60° C. for 30 minutes under reduced pressure. Thus there was obtained a catalyst component containing 3.8% of titanium.

Polymerization of Propylene

The catalyst component was used for the polymerization of propylene in the same way as in Example 23. The results are shown in Table 2.

COMPARATIVE EXAMPLE 3

Preparation of Catalyst Component

Into a 300-ml glass reactor equipped with a reflux condenser, dropping funnel, and stirrer, with the atmosphere replaced with nitrogen, were charged 100 ml of 10% butylethyl magnesium solution in n-heptane. While stirring at room temperature, a mixture of 18.2 g of 2-ethylhexanol and 30 ml of n-heptane was dropped from the dropping funnel over 15 minutes. Stirring was continued at 80° C. for 2 hours. After cooling to room temperature, 1.3 g of phthalic anhydride was added and treatment was carried out at 100° C. for 1 hour. After cooling to room temperature, there was obtained a uniform solution (A).

The uniform solution (A) was added dropwise to a 500-ml glass reactor equipped with a reflux condenser and a stirrer, with the atmosphere replaced with nitrogen, to which 200 ml of titanium tetrachloride had been added and which had been cooled to −20° C. The dropwise addition was performed over 1 hour with stirring at −20° C. The reaction system was heated to 100° C., and 3.9 ml of diisobutyl phthalate was added. Reaction was carried out at 105° C. for 2 hours. The supernatant liquid was removed by decantation and 200 ml of titanium tetrachloride was added. Reaction was performed at 105° C. for 2 hours. After the completion of reaction, the resulting solid substance was filtered off at 105° C. and washed with seven 250-ml portions of n-hexane at 65° C., followed by drying at 60° C. for 30 minutes under reduced pressure. Thus there was obtained a catalyst component containing 3.0% of titanium.

Polymerization of Propylene

The catalyst component thus obtained was used for polymerization of propylene in the same way as in Example 23. The results are shown in Table 2.

EXAMPLES 31 to 36

Polymerization of propylene was carried out in the same way as in Examples 2, 4, 6, 12, 17, and 18, respectively, except that phenyltriethoxysilane was replaced by 0.08 gram mol of phenyltriethoxysilane and 0.02 gram mol of ethyl p-anisate for 1 gram atom of aluminum in TEAL. The results are shown in Table 2.

EXAMPLE 37

Polymerization of propylene was carried out in the same way as in Example 31 except that ethyl anisate was replaced by 0.02 gram mol of ethyl benzoate. The results are shown in Table 2.

TABLE 2

| Example | Titanium content (%) | Polymerization time (h) | Kc (g/g-cat.) | Kt (kg/g-Ti) | Bulk HI (%) | density (g/cm$^3$) | MFR (g/10 min) |
|---|---|---|---|---|---|---|---|
| 19 | 4.1 | 1 | 16,200 | 421 | 96.7 | 0.40 | 4.2 |
|  |  | 2 | 29,200 | 711 | 96.0 | 0.40 | 3.9 |
| 20 | 3.8 | 1 | 16,000 | 421 | 96.7 | 0.40 | 4.2 |
|  |  | 2 | 28,800 | 758 | 96.1 | 0.42 | 4.5 |
| 21 | 4.4 | 1 | 17,100 | 389 | 96.4 | 0.37 | 4.4 |
|  |  | 2 | 31,600 | 718 | 95.8 | 0.38 | 4.8 |
| 22 | 4.2 | 1 | 16,500 | 393 | 96.4 | 0.38 | 3.8 |
|  |  | 2 | 29,900 | 712 | 96.0 | 0.38 | 3.9 |
| 23 | 4.5 | 1 | 23,000 | 511 | 96.0 | 0.38 | 27 |
|  |  | 2 | 46,000 | 1022 | 95.9 | 0.40 | 31 |
| 24 | 4.5 | 1 | 14,700 | 327 | 95.3 | 0.32 | 1.8 |
| 25 | 4.5 | 1 | 16,500 | 367 | 97.0 | 0.40 | 2.6 |
| 26 | 4.5 | 1 | 17,500 | 389 | 95.0 | 0.39 | 2.9 |
| 30 | 4.5 | 1 | 16,800 | 373 | 97.2 | 0.40 | 2.0 |
| 31 | 4.5 | 1 | 16,800 | 373 | 98.0 | 0.40 | 4.0 |
|  |  | 2 | 31,000 | 689 | 97.6 | 0.40 | 4.1 |
| 32 | 5.0 | 1 | 14,000 | 280 | 97.0 | 0.37 | 4.1 |
|  |  | 2 | 26,500 | 530 | 96.5 | 0.37 | 4.3 |
| 33 | 4.7 | 1 | 13,800 | 294 | 97.5 | 0.39 | 4.3 |
|  |  | 2 | 24,000 | 511 | 96.4 | 0.39 | 4.5 |
| 34 | 3.8 | 1 | 9,900 | 261 | 95.7 | 0.37 | 2.5 |
|  |  | 2 | 18,500 | 487 | 95.1 | 0.39 | 3.1 |
| 35 | 3.5 | 1 | 15,500 | 443 | 96.8 | 0.38 | 4.2 |
|  |  | 2 | 28,100 | 803 | 96.3 | 0.39 | 4.8 |
| 36 | 3.0 | 1 | 14,500 | 483 | 97.1 | 0.39 | 4.8 |
|  |  | 2 | 26,800 | 893 | 96.8 | 0.40 | 4.9 |
| 37 | 4.5 | 1 | 16,500 | 367 | 97.1 | 0.40 | 3.8 |
|  |  | 2 | 30,500 | 678 | 96.9 | 0.40 | 4.0 |
| 1* | 4.5 | 1 | 6,500 | 144 | 93.0 | 0.34 | 4.5 |
|  |  | 2 | 9,100 | 202 | 92.0 | 0.36 | 6.5 |
| 2* | 3.8 | 1 | 9,800 | 258 | 95.0 | 0.35 | 59 |
|  |  | 2 | 16,000 | 421 | 93.0 | 0.36 | 50 |
| 3* | 3.0 | 1 | 4,000 | 133 | 94.2 | 0.347 | 21 |
|  |  | 2 | 6,800 | 227 | 93.7 | 0.38 | 24 |

*Comparative Example

What is claimed is:

1. A catalyst for polymerizing olefins, said catalyst composed of
 (A) a titanium-containing catalyst component obtained by contacting with one another,
 (a) a magnesium dialkoxide,
 (b) a silane having at least one hydrogen-silicon bond, and
 (c) an electron donor compound, and
 (d) a titanium compound,
 (B) an organic compound of a metal of Groups I and III of the Periodic Table, and
 (C) an organo silicon compound represented by the formula $R_pSiX_m(OR')_n$ wherein R and R' are the same or different $C_{1-20}$ hydrocarbon groups, X is a halogen atom, $0 \leq p < 4$, $0 \leq m < 4$, $0 < n \leq 4$, and $p+m+n=4$.

2. The catalyst of claim 1 wherein the magnesium alkoxide and the silicon compound having the hydrogen-silicon bond are reacted together prior to contact with the electron donor and the titanium compound.

3. The catalyst of claim 2 wherein the silicon compound having the hydrogen-silicon bond is trichlorosilane and the magnesium dialkoxide is magnesium diethoxide.

4. The catalyst of claim 1 wherein the organic compound is an organoaluminum compound represented by the formula $R_w^8AlX'''_{3-w}$ wherein $R^8$ is an alkyl or aryl group X''' is a halogen atom alkoxyl group, or hydrogen atom and w is any number in the range of $1 \leq w \leq 3$.

5. The catalyst of claim 4 wherein the organoaluminum compound is a aluminum trialky.

6. The catalyst of claim 5 wherein the aluminum trialkyl is one of triethyl aluminum or triisobutyl aluminum.

7. The catalyst of claim 1 wherein the silicon compound is selected from ethyl triethoxy silane, vinyl triethoxy silane, phenyl trimethoxy silane, phenyl triethoxy silane, dipenyl dimethoxy silane, methyl phenyl dimethoxy silane, and chlorophenyl diethoxy silane.

8. The catalyst of claim 1 wherein the electron donor is selected from carboxylic acids, carboxylic acid anhydrides, carboxylate ester, carboxylic acid halides, alcohols, ethers, ketones, amines, amides, nitriles, aldehydes, alcoholates, phosphoamides, thioethers, thioesters, carbonate esters, and compound of phosporus, arsenic, or antimony attached to an organic group through a carbon or oxygen atom.

9. The catalyst of claim 8 wherein the electron donor is selected from carboxylic acids, carboxylic acid anhydrides, carboxylate esters, halogenated carboxylic acids, alcohols, and ethers.

10. The catalyst of claim 9 wherein the electron donor is ethyl benzoate, diisobutylphathalate, di-m-butylphthalate, phthalic anhydride, phthalic acid, or phthaloyl chloride.

11. The catalyst of claim 3 wherein the titanium compound is $TiCl_4$.

* * * * *